United States Patent
Lee et al.

(10) Patent No.: US 8,260,373 B2
(45) Date of Patent: Sep. 4, 2012

(54) MOBILE TERMINAL WITH VARIABLE DISPLAY CONTROL

(75) Inventors: Sang Hyun Lee, Seoul (KR); Hye Jin Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 573 days.

(21) Appl. No.: 12/207,361

(22) Filed: Sep. 9, 2008

(65) Prior Publication Data

US 2009/0069056 A1 Mar. 12, 2009

(30) Foreign Application Priority Data

Sep. 11, 2007 (KR) ........................ 10-2007-0092056

(51) Int. Cl.
*H04M 1/00* (2006.01)
(52) U.S. Cl. .................. 455/574; 455/566; 455/550.1; 713/300; 713/320; 713/322; 713/340
(58) Field of Classification Search .......... 455/572–574, 455/566, 550.1, 418; 713/300, 320, 322, 713/340
See application file for complete search history.

(56) References Cited

U.S. PATENT DOCUMENTS

| | | | | |
|---|---|---|---|---|
| 6,141,568 A * | 10/2000 | Sakaguchi | ................ | 455/566 |
| 6,157,849 A * | 12/2000 | Cho | ................ | 455/566 |
| 6,944,480 B2 * | 9/2005 | Tanaka et al. | ................ | 455/566 |
| 7,221,964 B2 * | 5/2007 | Brubacher-Cressman et al. | ................ | 455/566 |
| 7,406,342 B2 * | 7/2008 | Kim | ................ | 455/574 |
| 7,453,219 B2 * | 11/2008 | Mor et al. | ................ | 315/360 |
| 2003/0105983 A1 * | 6/2003 | Brakmo et al. | ................ | 713/320 |
| 2005/0104805 A1 * | 5/2005 | Masaki | ................ | 345/46 |
| 2006/0075268 A1 * | 4/2006 | Kim et al. | ................ | 713/300 |
| 2007/0133223 A1 * | 6/2007 | Fredley et al. | ................ | 362/600 |
| 2010/0075718 A1 * | 3/2010 | Brubacher-Cressman et al. | ................ | 455/566 |

FOREIGN PATENT DOCUMENTS

| | | | |
|---|---|---|---|
| EP | 1569423 | | 8/2005 |
| EP | 1569423 A1 * | | 8/2005 |
| JP | 09261750 | | 10/1997 |
| JP | 2004304260 | | 10/2004 |

* cited by examiner

*Primary Examiner* — Nick Corsaro
*Assistant Examiner* — Sarwat Chughtai
(74) *Attorney, Agent, or Firm* — Lee, Hong, Degerman, Kang & Waimey

(57) ABSTRACT

A mobile terminal with display control is disclosed. A method of controlling a display screen in the mobile terminal includes recognizing an operation mode of the mobile terminal, wherein the operation mode is associated with displaying information on a display at a first display state with a display control expiration period, displaying display control status information on a portion of the display prior to the display control expiration period, and adjusting the display control expiration period in response to recognizing an external user input.

30 Claims, 13 Drawing Sheets

MOBILE TERMINAL WITH VARIABLE DISPLAY CONTROL

CROSS-REFERENCE TO RELATED APPLICATIONS

Pursuant to 35 U.S.C. §119(a), this application claims the benefit of earlier filing date and right of priority to Korean Application No. 10-2007-0092056, filed on Sep. 11, 2007, the contents of which are hereby incorporated by reference herein in their entirety.

FIELD OF THE INVENTION

The present invention relates to a mobile terminal with variable display control and a method of controlling a display in the mobile terminal. In particular, the present invention provides a convenient method of controlling the display in the mobile terminal to reduce power consumption.

DISCUSSION OF THE RELATED ART

A mobile terminal may be configured to perform various functions. Examples of such functions include games, data and voice communications, and multimedia player functions, such as capturing images and video via a camera, recording audio, playing music files via a speaker system, and displaying images and video on a display. More recently, some mobile terminals have been configured to receive broadcast and multicast signals which permit viewing of content such as video and television programs.

In view of various functions performed by mobile terminals, mobile terminal users are concerned about the battery life in their mobile terminals since performing various functions will require much power and reduce the remaining battery power. The maximum usable time with a single battery charge depends on power consumption of the mobile terminal. To reduce the power consumption, the mobile terminal is generally configured to automatically adjust brightness of the display when the mobile terminal is not in use.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

According to an embodiment of the present invention, a method of controlling a display screen in a wireless mobile terminal includes recognizing an operation mode of the mobile terminal, wherein the operation mode is associated with displaying information on a display at a first display state with a display control expiration period; displaying display control status information on a portion of the display prior to the display control expiration period; and adjusting the display control expiration period in response to recognizing an external user input. Preferably, the display control expiration period is associated with controlling display illumination. Preferably, the display control status information includes a remaining time before transitioning from the first display state to a second display state.

In an aspect of the present invention, the external user input is recognized through one of contact on a touch screen and a predetermined switch. The display control status information may include a time line bar representing a remaining time before transitioning from the first display state to a second display state. The display control expiration period is adjusted in response to the external user input including a touch and drag motion and the display remains at the first display state upon recognizing the external user input and until a further external user input is recognized. The display control expiration period may be adjusted in response to multiple external user inputs.

According to an embodiment of the present invention, a method of controlling a display screen in a wireless mobile terminal includes recognizing an operation mode of the mobile terminal, wherein the operation mode is associated with displaying information on a display at a first display state such that the information is visible; displaying the information on the display at the first display state and starting a first preset period; timing the first preset period; and displaying display control status information on a portion of the display after the first preset period ends. Preferably, the second display state includes a less illuminated state or a turned-off state.

In an aspect of the present invention, the method further includes transitioning from the first display state to the second display state after a display control expiration period ends, wherein the display control expiration period starts when the first preset period ends and the display control status information is displayed during the display control expiration period. Preferably, the method also includes increasing the display control expiration period before the display control expiration period ends, wherein the first display state is maintained during the display control expiration period. Preferably, the display is in a less illuminated state compared to the first display state during the display control expiration period.

In an aspect of the present invention, the method further includes adjusting a display control expiration period in response to the display control status information, wherein the display control expiration period, which is associated with controlling a display state, starts when the first preset period ends. The method may also include turning off the display after a display control expiration period if no input is received by the wireless mobile terminal during the display control expiration period, wherein the display control expiration period, which starts after the preset period ends, is associated with controlling a display state.

In an aspect of the present invention, the method may include decreasing illumination on the display after a display control expiration period ends if no input is received by the wireless mobile terminal during the display control expiration period, wherein the display control expiration period, in which the display control status information is displayed, starts after the first preset period ends. The method may also include turning off the display in response to an external user input, wherein the external user input is recognized through one of contact on a touch screen and a predetermined switch. The method may further include displaying the information continuously at the first display state in response to an external user input, wherein the external user input is recognized through one of contact on a touch screen and a predetermined switch.

According to an embodiment of the present invention, a wireless mobile terminal includes a display unit displaying information at a first display state, the display unit displaying display control status information on a portion of a display screen prior to the display control expiration period; a user input unit for recognizing an external user input to adjust the display control expiration period; and a control unit configured to recognize an operation mode of the mobile terminal and display a display control expiration period on the display unit, wherein the operation mode is associated with displaying information on the display unit at the first display state.

It is to be understood that both the foregoing general description and the following detailed description of the present invention are exemplary and explanatory and are intended to provide further explanation of the invention as claimed.

BRIEF DESCRIPTION OF THE DRAWINGS

The above and other aspects, features, and advantages of the present invention will become more apparent upon consideration of the following description of preferred embodiments, taken in conjunction with the accompanying drawing figures.

DETAILED DESCRIPTION OF PREFERRED EMBODIMENT

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
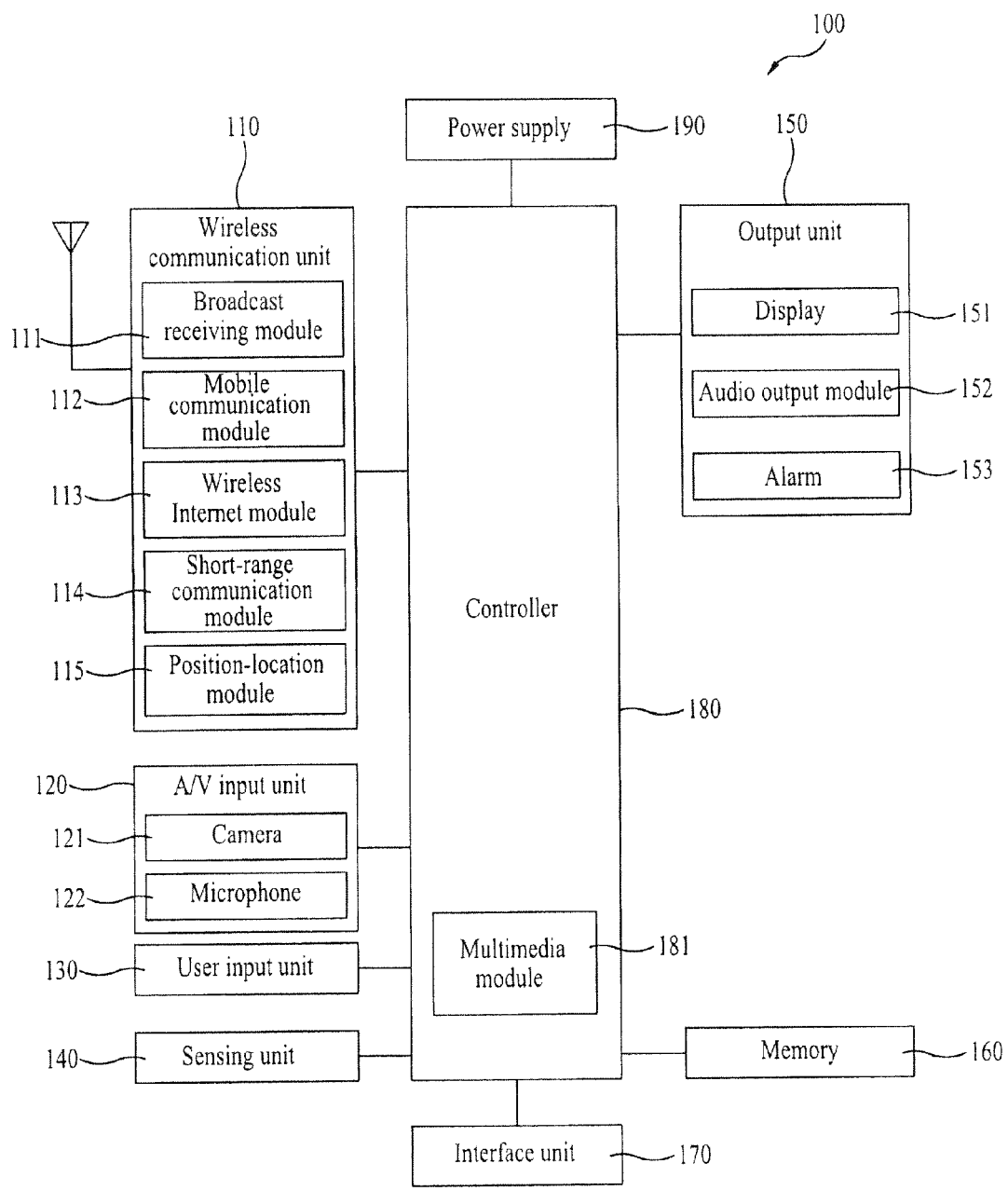
FIG. 1 is a block diagram of a mobile terminal according to an embodiment of the present invention.

FIG. 1 is a block diagram of mobile terminal 100 in accordance with an embodiment of the present invention. The mobile terminal 100 may be implemented using a variety of different types of terminals. Examples of such terminals include mobile phones, user equipment, smart phones, computers, digital broadcast terminals, personal digital assistants, portable multimedia players (PMP) and navigators.

By way of non-limiting example only, further description will be with regard to a mobile terminal 100. However, such teachings apply equally to other types of terminals. FIG. 1 shows the mobile terminal 100 having various components, but it is understood that implementing all of the illustrated components is not a requirement. Greater or fewer components may alternatively be implemented.

FIG. 1 shows a wireless communication unit 110 configured with several commonly implemented components. For example, the wireless communication unit 110 typically includes one or more components which permit wireless communication between the mobile terminal 100 and a wireless communication system or network within which the mobile terminal is located.

The broadcast receiving module 111 receives a broadcast signal and/or broadcast associated information from an external broadcast managing entity via a broadcast channel. The broadcast channel may include a satellite channel or a terrestrial channel. The broadcast managing entity refers generally to a system which transmits a broadcast signal and/or broadcast associated information.

Examples of the broadcast associated information include information associated with a broadcast channel, a broadcast program, and a broadcast service provider. For example, the broadcast associated information may include an electronic program guide (EPG) of digital multimedia broadcasting (DMB) or an electronic service guide (ESG) of digital video broadcast-handheld (DVB-H).

The broadcast signal may be implemented, for example, as a TV broadcast signal, a radio broadcast signal, or a data broadcast signal. The broadcast signal may further include a broadcast signal combined with a TV or radio broadcast signal.

The broadcast receiving module 111 may be configured to receive broadcast signals transmitted from various types of broadcast systems. By non-limiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®) and integrated services digital broadcast-terrestrial (ISDB-T). Receiving multicast signals is also possible. Data received by the broadcast receiving module 111 may be stored in a suitable device, such as a memory 160.

The mobile communication module 112 communicates wireless signals with one or more network entities, such as a base station or Node-B. Such signals may represent, for example, audio, video, multimedia, control signaling, or data.

The wireless Internet module 113 supports Internet access for the mobile terminal 100. The wireless Internet module 113 may be internally or externally coupled to the mobile terminal 100. Suitable technologies for wireless Internet may include, but are not limited to, WLAN (Wireless LAN) (Wi-Fi), Wibro (Wireless broadband), Wimax (World Interoperability for Microwave Access), and HSDPA (High Speed Downlink Packet Access).

The short-range communication module 114 facilitates relatively short-range communications. Suitable technologies for short-range communication may include, but are not limited to, radio frequency identification (RFID), infrared data association (IrDA), ultra-wideband (UWB), as well as the networking technologies commonly referred to as BLUETOOTH® and Zigbee®.

The position-location module 115 identifies or otherwise obtains the location of the mobile terminal 100. The position-location module 115 may be implemented using global positioning system (GPS) components which cooperate with associated satellites, network components, and combinations thereof.

The audio/video (A/V) input unit 120 is configured to provide audio or video signal input to the mobile terminal 100. As shown, the A/V input unit 120 includes a camera 121 and a microphone 122.

The camera 121 receives and processes image frames of still pictures or video. The microphone 122 receives an external audio signal while the portable device is in a particular mode, such as phone call mode, recording mode or voice recognition mode. This audio signal is processed and converted into digital data.

The mobile terminal 100 and specifically the A/V input unit 120, may include assorted noise removing algorithms to remove noise generated in the course of receiving the external audio signal. Data generated by the A/V input unit 120 may be stored in the memory 160, utilized by the output unit 150, or transmitted via one or more modules of the communication unit 110. If desired, two or more microphones 122 and/or cameras 121 may be used.

The user input unit 130 generates input data responsive to user manipulation of an associated input device or devices. Examples of such devices include a keypad, a dome switch, a touchpad such as a static pressure/capacitance, a jog wheel and a jog switch. A specific example is a user input unit 130 configured as a touchpad in cooperation with a touch screen display, which will be described in more detail below.

The sensing unit 140 provides status measurements of various aspects of the mobile terminal 100. For example, the sensing unit 140 may detect an open/close status of the mobile terminal 100, the relative positioning of components such as a display and keypad, a change of position of the mobile terminal or a component of the mobile terminal, a presence or absence of user contact with the mobile terminal, or the orientation or acceleration/deceleration of the mobile terminal.

The sensing unit 140 may sense whether a sliding portion of the mobile terminal 100 is open or closed if the mobile terminal is configured as a slide-type mobile terminal. The sensing unit 140 may also sense the presence or absence of power provided by the power supply 190, and the presence or absence of a coupling or other connection between the interface unit 170 and an external device.

The interface unit 170 may be implemented to couple the mobile terminal 100 with external devices. Typical external devices include wired/wireless headphones, external chargers, power supplies, earphones, microphones and storage devices configured to store data such as audio, video, and pictures. The interface unit 170 may be configured using a wired/wireless data port, audio input/output ports, video input/output ports, or a card socket for coupling to a memory card, a subscriber identity module (SIM) card, a user identity module (UIM) card, or a removable user identity module (RUIM) card).

The output unit 150 may include various components that support the output requirements of the mobile terminal 100. The display 151 may be implemented to visually display information associated with the mobile terminal 100. The display 151 may provide a user interface or graphical user interface that includes information associated with placing, conducting, and terminating a phone call if the mobile terminal 100 is operating in a phone call mode. As another example, the display 151 may additionally or alternatively display images associated with a video call mode or a photographing mode.

One particular implementation of the present invention includes the display 151 configured as a touch screen working in cooperation with an input device, such as a touchpad. This configuration permits the display 151 to function both as an output device and an input device.

The display 151 may be implemented using known display technologies including a liquid crystal display (LCD), a thin film transistor-liquid crystal display (TFT-LCD), an organic light-emitting diode display (OLED), a flexible display and a three-dimensional display. The mobile terminal 100 may include one or more displays 151. An example of a two-display embodiment is one in which one display 151 is configured as an internal display viewable when the terminal is in an opened position and a second display 151 configured as an external display viewable in both the open and closed positions.

FIG. 1 further shows the output unit 150 having an audio output module 152, which supports the audio output requirements of the mobile terminal 100. The audio output module 152 may be implemented using one or more speakers, buzzers, other audio producing devices, or combinations thereof.

The audio output module 152 functions in various modes such as call-receiving mode, call-placing mode, recording mode, voice recognition mode and broadcast reception mode. The audio output module 152 outputs audio relating to a particular function or status, such as call received, message received, or errors.

The output unit 150 is further shown having an alarm 153, which may signal or otherwise identify the occurrence of a particular event associated with the mobile terminal 100. Typical events include call received, message received and user input received.

An example of a signal provided by the output unit 150 is a tactile sensation. For example, the alarm 153 may be configured to vibrate responsive to the mobile terminal 100 receiving a call or message. As another example, vibration may be provided by the alarm 153 responsive to receiving user input at the mobile terminal 100 in order to provide a tactile feedback mechanism. It is understood that the various signals provided by the components of the output unit 150 may be separately performed, or performed using any combination of such components.

The memory 160 is generally used to store various types of data to support the processing, control, and storage requirements of the mobile terminal 100. Examples of such data include program instructions for applications operating in the mobile terminal 100, contact data, phonebook data, messages, pictures, and video.

The memory 160 shown in FIG. 1 may be implemented using any type or combination of suitable volatile and non-volatile memory or storage devices. Examples of memory types are random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk memory, card-type memory, and other similar memory or data storage device.

The controller 180 typically controls the overall operations of the mobile terminal 100. For example, the controller 180 performs the control and processing associated with voice calls, data communications, instant message communication, video calls, camera operations and recording operations.

The controller 180 may include a multimedia module 181 that provides multimedia playback. The multimedia module 181 may be configured as part of the controller 180, or implemented as a separate component.

The power supply 190 provides power required by the various components for the mobile terminal 100. The power may be internal power, external power, or combinations thereof.

Various embodiments described herein may be implemented in various ways. For example, the embodiments may be implemented in a computer-readable medium using computer software, hardware, or some combination thereof.

For a hardware implementation, the embodiments described may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which perform one or more of the functions and operations described herein. The software codes can be implemented with a software application written in any suitable programming language and may be stored in memory, such as the memory 160, and executed by a controller or processor, such as the controller 180.

The mobile terminal 100 may be implemented in a variety of different configurations. Examples of such configurations include folder-type, slide-type, bar-type, rotational-type, swing-type and combinations thereof. For clarity, further disclosure will primarily relate to a slide-type mobile terminal 100. However, such teachings apply equally to other types of mobile terminals 100.

Figure 2:
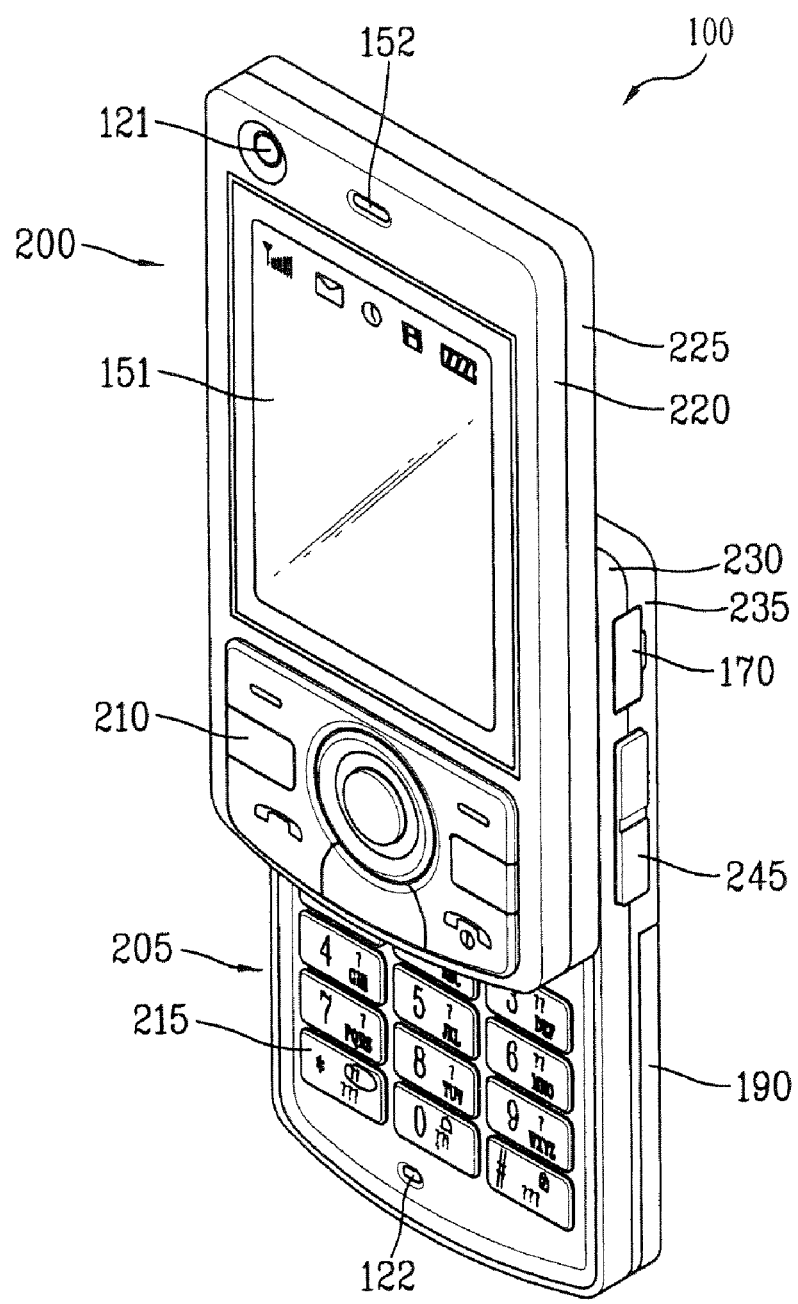
FIG. 2 is a perspective view of a front side of a mobile terminal according to an embodiment of the present invention.

FIG. 2 is a perspective view of a front side of a mobile terminal 100 according to an embodiment of the present invention. In FIG. 2, the mobile terminal 100 is shown having a first body 200 configured to slidably cooperate with a second body 205.

The user input unit 130 (described in FIG. 1) is implemented using function keys 210 and a keypad 215. The function keys 210 are located on the first body 200 and the keypad 215 is located on the second body 205. The keypad 215 includes various keys, such as numbers, characters, and symbols to enable a user to place a call, prepare a text or multimedia message, and otherwise operate the mobile terminal 100.

The first body 200 slides relative to the second body 205 between open and closed positions. The first body 200 is positioned over the second body 205 in the closed position such that the keypad 215 is substantially or completely obscured by the first body. User access to the keypad 215, the display 151 and the function keys 210 is facilitated in the open position. The function keys 210 are conveniently configured for a user to enter commands, such as start, stop and scroll.

The mobile terminal 100 is operable in either a standby mode or an active call mode. The mobile terminal 100 is able to receive a call or message and to receive and respond to network control signaling in the standby mode.

The mobile terminal 100 typically operates in the standby mode in the closed position and in the active mode in the open position. This mode configuration may be changed as required or desired.

The first body 200 is shown formed of a first case 220 and a second case 225. The second body 205 is shown formed of a first case 230 and a second case 235. The first cases 220, 230 and second cases 205, 235 are usually formed of a suitably rigid material, such as injection molded plastic, or formed using metallic material, such as stainless steel (STS) or titanium (Ti).

One or more intermediate cases may be provided between the first case 225 and second case 225 of the first body 200 or between the first case 230 and second case 235 of the second body 205. The first body 200 and second body 205 are typically sized to receive electronic components necessary to support operation of the mobile terminal 100.

The first body 200 is shown having a camera 121 and audio output module 152, which is configured as a speaker, positioned relative to the display 151. The camera 121 may be constructed such that it can be selectively positioned relative to first body 200, such as by rotation or swiveling.

The function keys 210 are positioned adjacent to a lower side of the display 151, which is shown implemented as an LCD or OLED. The display 151 may also be configured as a touch screen having an underlying touchpad which generates signals responsive to user contact with the touch screen, such as with a finger or stylus.

The second body 205 is shown having a microphone 122 positioned adjacent to the keypad 215 and having side keys 245, which are one type of user input unit 130, positioned along the side of second body. Preferably, the side keys 245 are configured as hot keys, such that the side keys are associated with a particular function of the mobile terminal 100.

An interface unit 170 is shown positioned adjacent to the side keys 245. A power supply 190 in a form of a battery is shown located on a lower portion of the second body 205.

Figure 3:
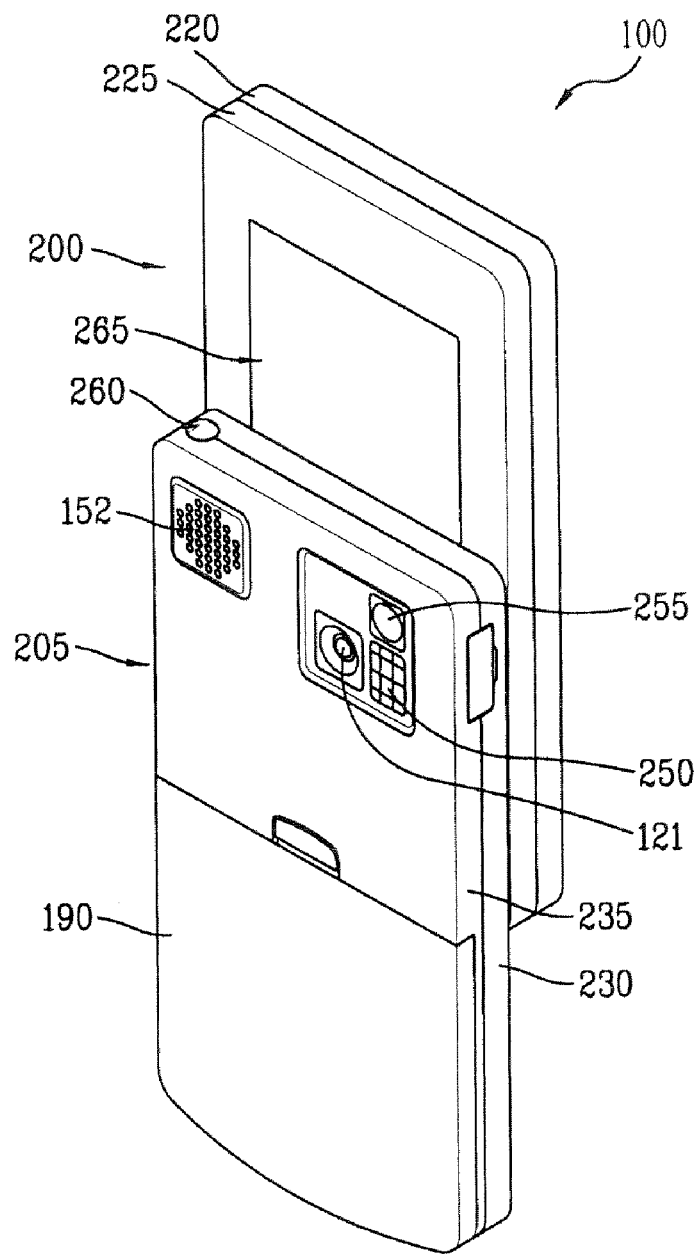
FIG. 3 is a rear view of the mobile terminal shown in FIG. 2.

FIG. 3 is a rear view of the mobile terminal shown in FIG. 2. FIG. 3 shows the second body 205 having a camera 121 with an associated flash 250 and mirror 255. The flash 250 operates in conjunction with the camera 121. The mirror 255 is useful for assisting a user to position the camera 121 in a self-portrait mode.

The camera 121 of the second body 205 illustrated in FIG. 3 faces a direction opposite to a direction faced by the camera 121 of the first body 200 illustrated in FIG. 2. Each of the cameras 121 of the first body 200 and second body 205 may have the same or different capabilities.

The camera 121 of the first body 200 in one embodiment operates with a relatively lower resolution than the camera 121 of the second body 205. Such an arrangement works well during a video conference, for example, in which reverse link bandwidth capabilities may be limited. The relatively higher resolution of the camera 121 of the second body 205 is useful for obtaining higher quality pictures for later use or for communicating with other parties.

The second body 205 illustrated in FIG. 3 also includes an audio output module 152 located on an upper side of the second body and configured as a speaker. The audio output modules 152 of the first body 200 and second body 205 may cooperate to provide stereo output. Moreover, either or both of these audio output modules 152 may be configured to operate as a speakerphone.

A broadcast signal receiving antenna 260 is shown located at an upper end of the second body 205 in FIG. 3. The antenna 260 functions in cooperation with the broadcast receiving module 111 illustrated in FIG. 1. The antenna 260 may be fixed or retractable into the second body 205.

The rear side of the first body 200 includes a slide module 265. The slide module 265 slidably couples with a corresponding slide module located on the front side of the second body 205.

It is understood that the arrangement of the various components of the first body 200 and second body 205 illustrated in FIGS. 2 and 3 may be modified as required or desired. For example, some or all of the components of one body may be implemented in the other body. Further, the location and relative positioning of the components are not critical and, therefore, the components may be positioned at locations which differ from those shown in FIGS. 2 and 3.

The mobile terminal 100 of FIGS. 1-3 may be configured to operate within a communication system which transmits data via frames or packets, including both wireless and wired communication systems and satellite-based communication systems. Such communication systems utilize different air interfaces and/or physical layers.

Examples of air interfaces utilized by the communication systems include frequency division multiple access (FDMA), time division multiple access (TDMA), code division multiple access (CDMA), the universal mobile telecommunications system (UMTS), the long term evolution (LTE) of the UMTS, and the global system for mobile communications (GSM). By way of non-limiting example only, further description will relate to a CDMA communication system, but such teachings apply equally to other system types.

Figure 4:
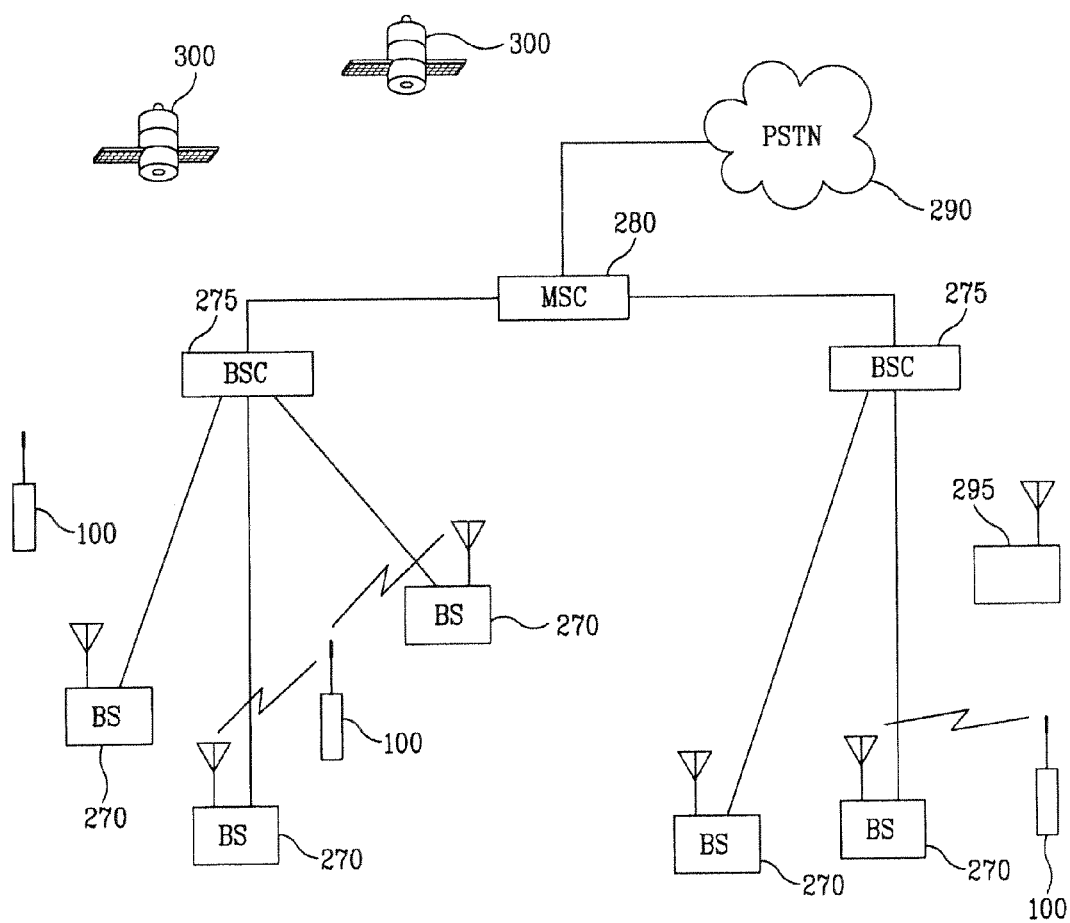
FIG. 4 is a block diagram of a CDMA wireless communication system operable with the mobile terminal of FIGS. 1-3.

Referring to FIG. 4, a CDMA wireless communication system is shown having a plurality of mobile terminals 100, a plurality of base stations (BS) 270, a plurality of base station controllers (BSC) 275, and a mobile switching center (MSC) 280.

The MSC 280 is configured to interface with a conventional public switch telephone network (PSTN) 290. The MSC 280 is also configured to interface with the BSCs 275.

The BSCs 275 are coupled to the base stations 270 via backhaul lines. The backhaul lines may be configured in accordance with any of several known interfaces including E1/T1, ATM, IP, PPP, Frame Relay, HDSL, ADSL, or xDSL. It is to be understood that the system may include more than two BSCs 275.

Each BS 270 may include one or more sectors, each sector having an omni-directional antenna or an antenna pointed in a particular direction radially away from the base station. Alternatively, each sector may include two antennas for diversity reception. Each BS 270 may be configured to support a plurality of frequency assignments each having a particular spectrum, such as 1.25 MHz or 5 MHz.

The intersection of a sector and frequency assignment may be referred to as a CDMA channel. The BSs 270 may also be referred to as base station transceiver subsystems (BTSs).

The term "base station" may be used to refer collectively to a BSC 275 and one or more BSs 270. The BSs 270 may also be denoted as "cell sites." Alternatively, individual sectors of a given BS 270 may be referred to as "cell sites."

A terrestrial digital multimedia broadcasting (DMB) transmitter (BT) 295 is shown broadcasting to the mobile terminals 100 operating within the system. The broadcast receiving module 111 illustrated in FIG. 1 may be configured to receive broadcast signals transmitted by the BT 295. Similar arrangements may be implemented for other types of broadcast and multicast signaling as discussed above.

FIG. 4 further depicts several global positioning system (GPS) satellites 300 that facilitate locating the position of some or all of the mobile terminals 100. Two satellites 300 are depicted, but it is understood that useful positioning information may be obtained with greater or fewer satellites.

The position-location module 115 illustrated in FIG. 1 may be configured to cooperate with the satellites 300 to obtain desired position information. It is to be appreciated that other types of position detection technology may alternatively be implemented, such as location technology that may be used in addition to or instead of GPS location technology. If desired, some or all of the GPS satellites 300 may alternatively or additionally be configured to provide satellite DMB transmissions.

During typical operation of the wireless communication system, the BSs 270 receive sets of reverse-link signals from various mobile terminals 100. The mobile terminals 100 perform calls, messaging, and other communications.

Each reverse-link signal received by a given BS 270 is processed within that BS. The resulting data is forwarded to an associated BSC 275.

The BSC 275 provides call resource allocation and mobility management functionality including soft handoffs between the BSs 270. The BSCs 275 also route the received data to the MSC 280, which provides additional routing services for interfacing with the PSTN 290.

Similarly, the PSTN 290 interfaces with the MSC 280, which interfaces with the BSCs 275. The BSCs 275 control the BSs 270 to transmit sets of forward-link signals to the mobile terminals 100.

In an embodiment of the present invention, the display module is arranged in a mutual layer structure with a touch-pad to work as a touch screen. However, implementation of the present invention is not limited to the touch screen. The present invention may also be implemented through manipulation of a user input unit such as a keypad.

A method of controlling a display 151 in a mobile terminal 100 according to an embodiment of the present invention is explained with reference to FIGS. 5 to 7. Referring to FIG. 6, when a mobile terminal user executes a specific function through the mobile terminal 100, depending on an operational mode of the mobile terminal, information display may be necessary to execute the specific function properly. For example, as shown in (6-1), when the mobile terminal user checks a message received via the mobile terminal 100, the mobile terminal recognizes the operational mode and determines that the display screen 151 needs to be illuminated such that the displayed message is visible. The present invention is also applicable to other functions or operational modes requiring the information display. The mobile terminal 100 recognizes the operational mode and determines whether the operation mode is associated with displaying information on the display 151.

Figure 5:
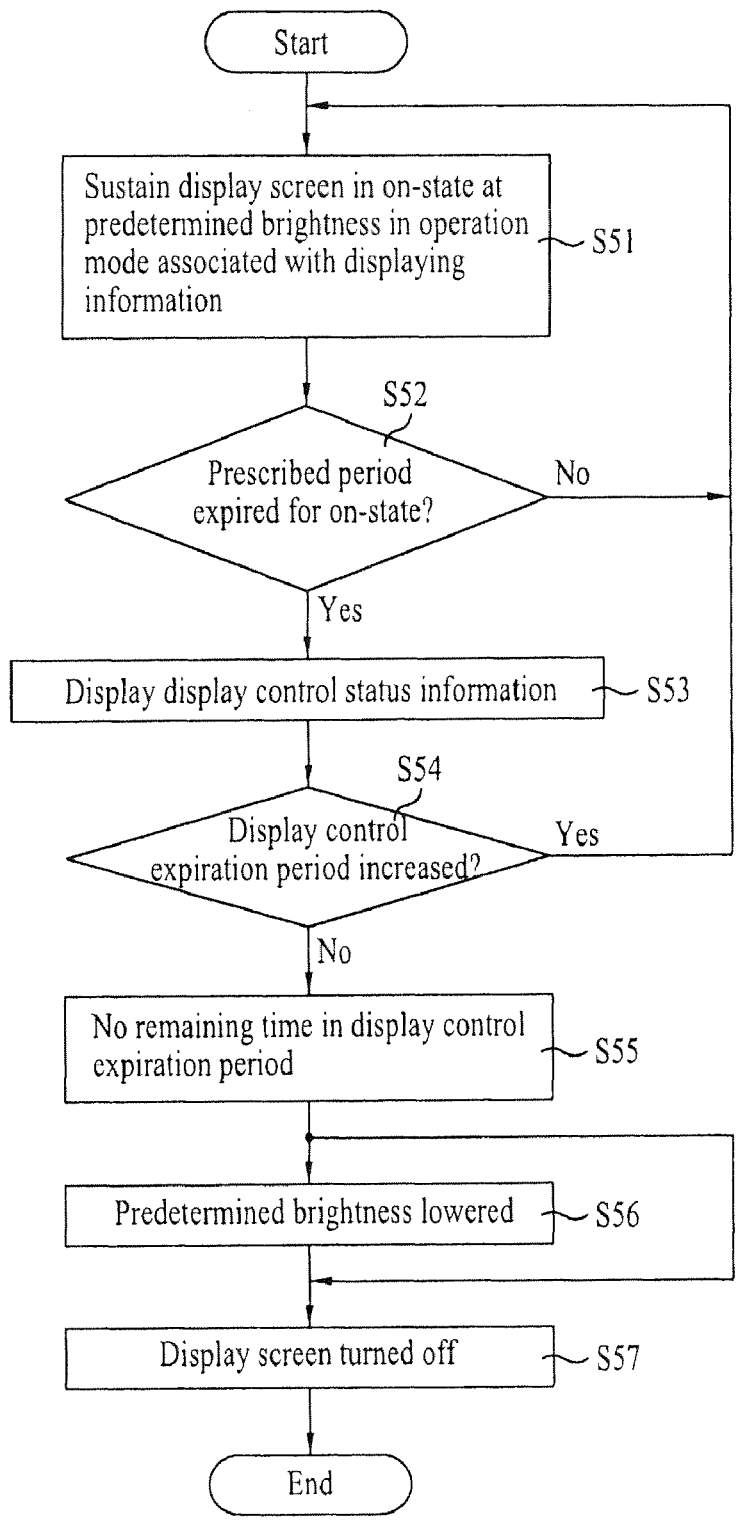
FIG. 5 is a flowchart illustrating a method of controlling a display in a mobile terminal according to an embodiment of the present invention.
Figure 6:
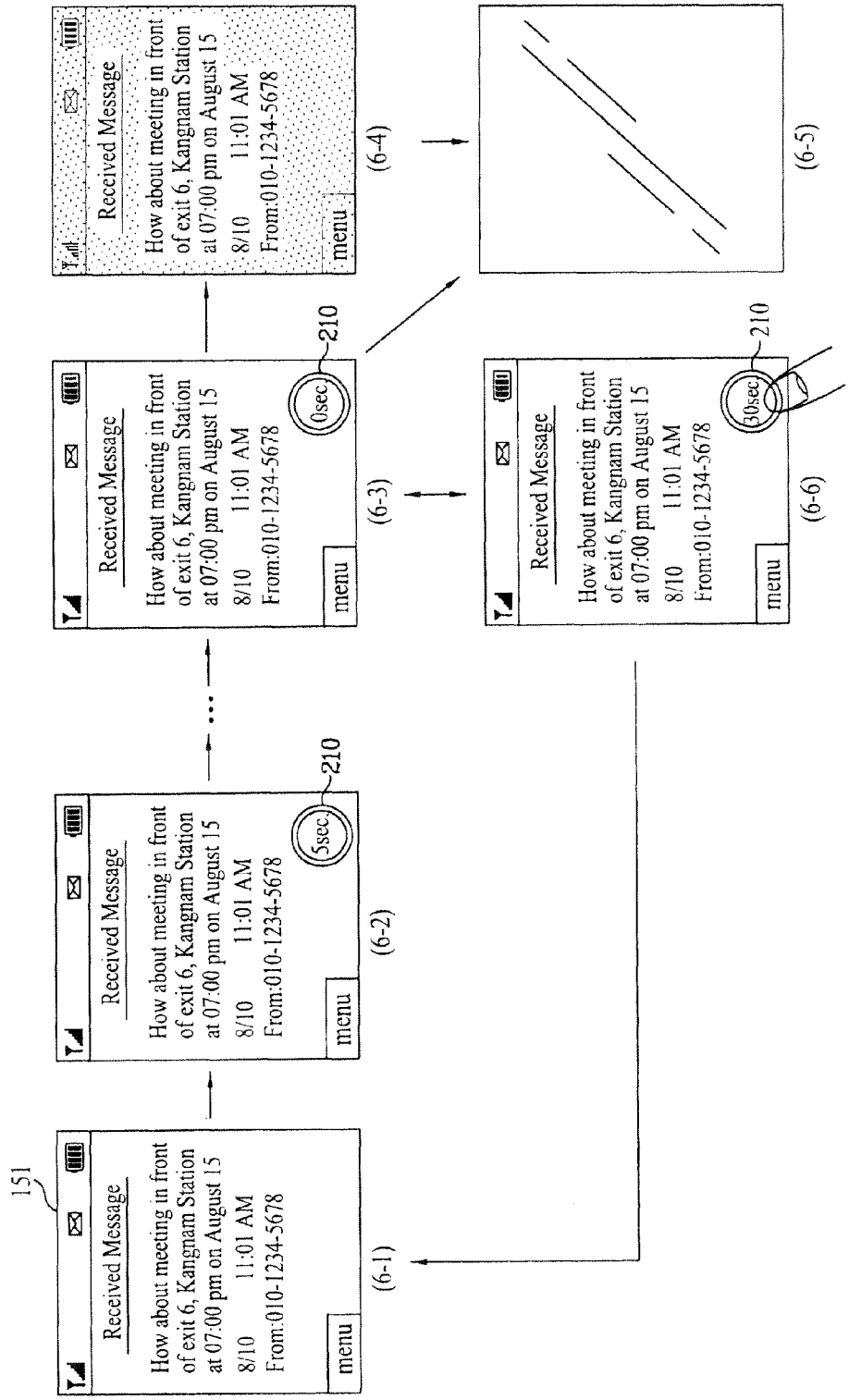
FIG. 6 and FIG. 7 are diagrams illustrating a method of controlling a display in a mobile terminal according to an embodiment of the present invention.

Referring to FIGS. 5 and 6, the received message is displayed with backlight illumination on the display screen 151 when the display is activated and turned on in response to an input or the received message which is recognized by the mobile terminal 100 as an operational mode associated with displaying information (S51 in FIG. 5). The received message may be automatically displayed by the mobile terminal 100 upon receipt of the message or displayed in response to the user's selection or input.

Generally, the mobile terminal 100 is configured to dim or decrease the brightness of the display screen 151, or turn off the display screen after a preset period if no function is being executed or no input is entered. Therefore, while checking the received message, as in (6-1), the display screen 151 is dimmed or turned off after the preset period if the user is simply reading the message without inputting any information. The display screen 151 is dimmed or turned off to reduce power consumption of the mobile terminal 100 as much as possible.

Therefore, the display screen 151 may be dimmed or turned off abruptly without any warning before the mobile terminal user finishes reading the received message after the preset period since the time the message was displayed. If this happens, the mobile terminal user needs to manipulate the mobile terminal 100 to display the received message again. This will cause inconvenience to the terminal user.

To avoid the above mentioned problem, the mobile terminal 100 may be preset to extend the period of the backlight illumination on the display screen 151. However, generally, such extended preset period is collectively applied to all applications once it is set. As a result, the backlight may illuminate on the display screen 151 even when the user is finished with the application and the backlight is not necessary. For example, in (6-1) of FIG. 6, if the user finishes reading the received message before the preset period expires, the backlight will remain being illuminated until the preset period expires even if the user is not looking at the display screen 151. This will result in unnecessary power consumption of the mobile terminal 100. The present invention is provided to solve this problem and reduce the power consumption of the mobile terminal 100.

In the present invention, the mobile terminal 100 is configured to change the brightness of the display screen 151 at the end of a first preset period before the display screen is turned off. When information is displayed on the display screen 151 with the backlight illumination (6-1) (S51 in FIG. 5), the controller 180 monitors duration of the backlight illumination and determines when to display 'display control status information' (S52 in FIG. 5) to alert the user of the remaining time until the display screen is dimmed. Accordingly, when it is determined that the first preset period expired (S52 Yes in FIG. 5), the display control status information is displayed to indicate a display control expiration period (6-2) (S53 in FIG. 5).

The display control status information may be displayed in various ways. For example, actual remaining time in the display control expiration period may be indicated by an icon 210, specifically, '5 sec.' as shown in (6-2). Further, decreasing remaining time in the display control expiration period may be displayed from '5 sec.' to '0 sec.' as shown in (6-2) through (6-3).

Alternatively, the display control status information may be displayed by other types of indicators, for example, by changing the color of an indicator according to the amount of the remaining time in the display control expiration period. Or the brightness of the display screen 151 may decrease stepwise, for example every second, until the display screen 151 is dimmed. Therefore, the mobile terminal user will notice that the state of the display screen 151 will vary after reaching the end of the display control expiration period from the display control status information.

If no information is input or no action is taken by the user during the display control expiration period (S54 'No' in FIG. 5) or until after the display control expiration period icon 210 reaches '0 sec' (6-3), the display control expiration period expires (S55 in FIG. 5) and the backlight illumination is dimmed as shown in (6-4) (S56 in FIG. 5). The dimmed backlight may stay for a predetermined time before the display screen 151 is eventually turned off as shown in (6-5) (S57 in FIG. 5). The user may re-illuminate the dimmed backlight as before by simply touching the dimmed screen in (6-4). Alternatively, after the display control expiration period expires after displaying '0 sec.' as shown in (6-3), the display screen may be turned off (6-5) without being dimmed, skipping (6-4).

The mobile terminal user extends or renews the illumination period if more time is necessary to finish the current operation (S54 'Yes' in FIG. 5). For example, the illumination period may be extended by touching the icon 210 for the display control status information, as shown in (6-6). In (6-6), the illumination period or the display control expiration period has been extended by 30 seconds. Alternatively, the illumination period may be extended by touching anywhere on the touch screen or manipulating any input unit other than the touch screen, such as a key button.

The illumination period may be extended at any time during the display control expiration period (6-2) through (6-3). Once extended, the display control expiration period restarts and the above described steps are repeated.

The mobile terminal 100 may be configured such that the illumination period increases by a predetermined time in proportion to a touch count of the icon 210. For example, 5 seconds may be increased per 1 touch count and to increase 30 seconds as shown in (6-6), the icon 210 needs to be touched 6 times by the user. Alternatively, the mobile terminal 100 may be configured such that the illumination period increases by a predetermined time in proportion to the length of the icon 210 being touched by the user. For example, the illumination period increases by 5 seconds per 0.5 second of touch period.

In one aspect of the present invention, to reduce the power consumption of the mobile terminal 100, the display screen 151 may be turned off at any time while the display screen is being illuminated manually. For example, a turn-off icon may be provided at a portion of the display screen 151 when the backlight of the display screen is being illuminated and the display screen is turned off simply by touching the turn-off icon when the illumination is not necessary on the display screen. Alternatively, the mobile terminal 100 may be configured such that the display screen 151 is turned off after a predetermined time when the user touches and holds the icon 210 displayed in (6-2), (6-3), or (6-6).

Figure 7:
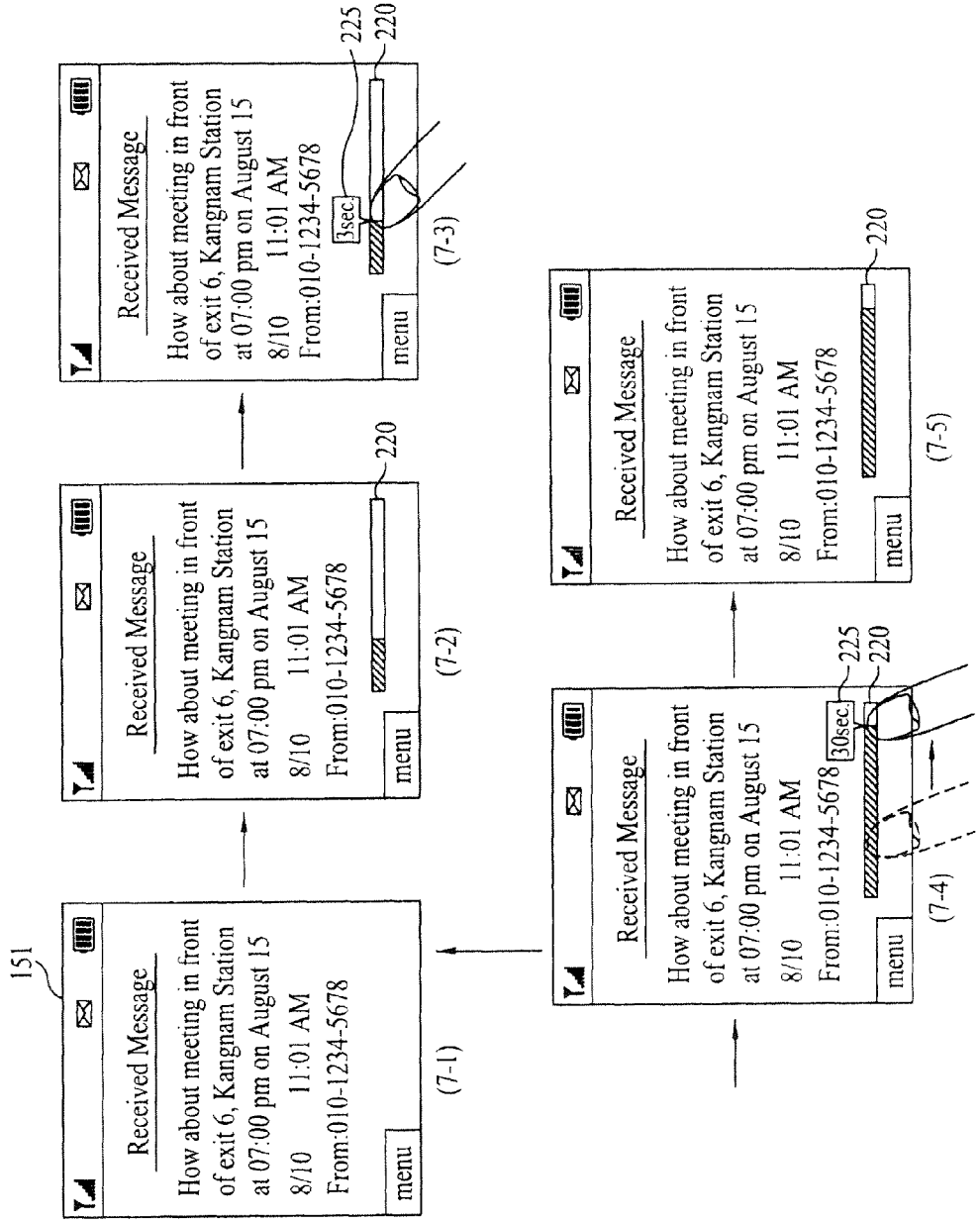

Referring to FIG. 7, the received message is displayed on the display screen 151 (7-1). When the first preset period ends, the display control status information is displayed on the display screen 151 in a form of a bar gauge 220 to indicate the remaining time in the display control expiration period, as shown in (7-2). For example, the colored portion of the bar gauge 220 indicates the time remaining in the display control expiration period. Accordingly, when the remaining time in the display control expiration period becomes 0 or there is no colored portion left in the bar gauge 220, the display state of the display screen 151 will be changed, for example, dimmed or turned off.

When the mobile terminal user touches one end of the bar gauge 220 using a pointer, such as a finger or stylus pen, the actual remaining time 225 in the display control expiration period, for example, '3 sec.', is displayed near the bar gauge (7-3). If the mobile terminal user wishes to extend the display control expiration period or an illumination period, the terminal user touches the end of the colored portion in the bar gauge 220 in one direction toward an uncolored portion of the bar gauge, for example from left to right, as shown in (7-4). Accordingly, the display control expiration period is extended in proportion to the dragged distance in the bar gauge 220 up to a point where the touch is released and the reset display control expiration period or remaining time 225 is displayed, for example, '30 sec.' as shown in (7-4).

Alternatively, rather than dragging the bar, the mobile terminal user may simply touch a desired point on the bar gauge 220 to reset the display control expiration period and extend the remaining time up to the touched point. For example, in (7-4), the mobile terminal user may directly touch the '30 sec.' point in the bar gauge 220, rather than dragging the bar, to reset the display control expiration period to 30 seconds.

Then, the reset display control expiration period gradually decreases from 30 seconds. The remaining time of the display control expiration period is indicated by a gradual decrease of the colored portion in the bar gauge 220, as shown in (7-5).

Figure 8:
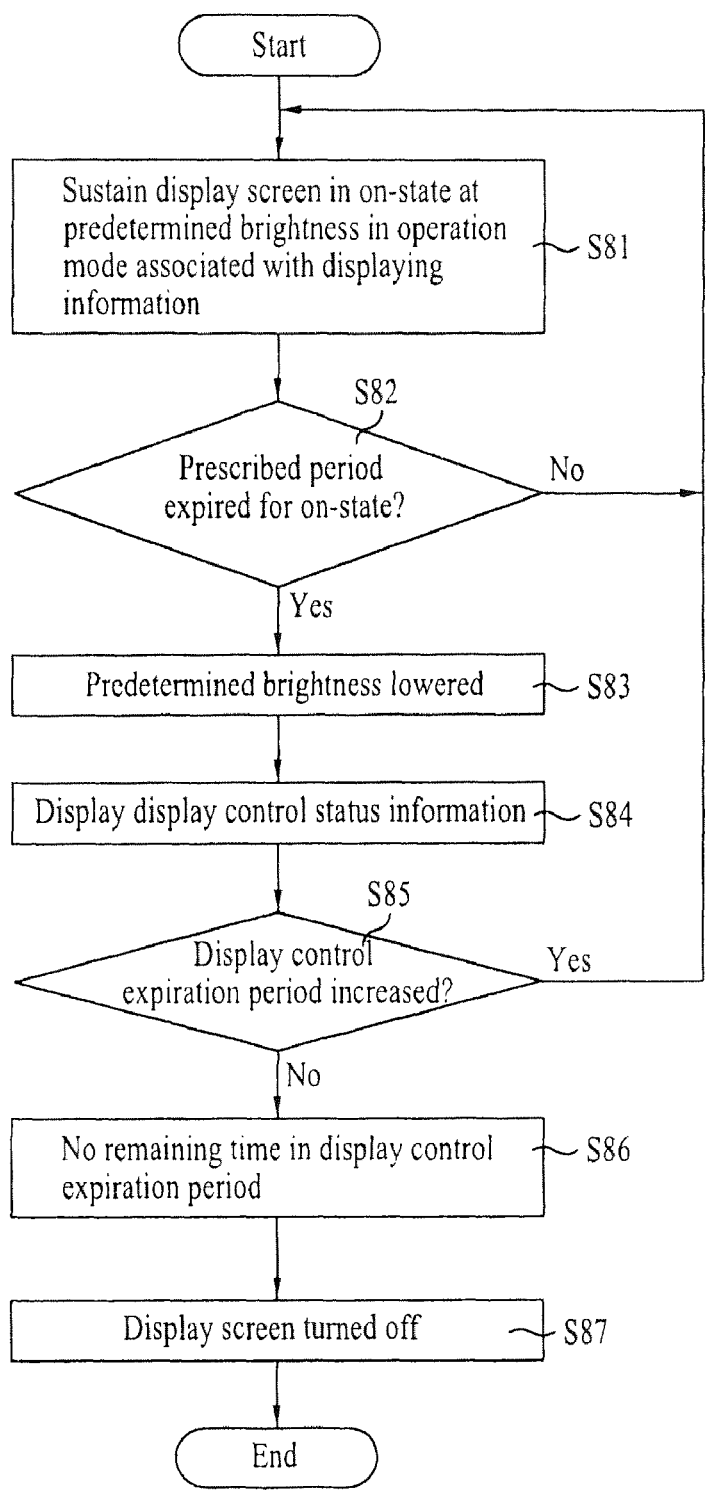
FIG. 8 is a flowchart illustrating a method of controlling a display in a mobile terminal according to an embodiment of the present invention.
Figure 9:
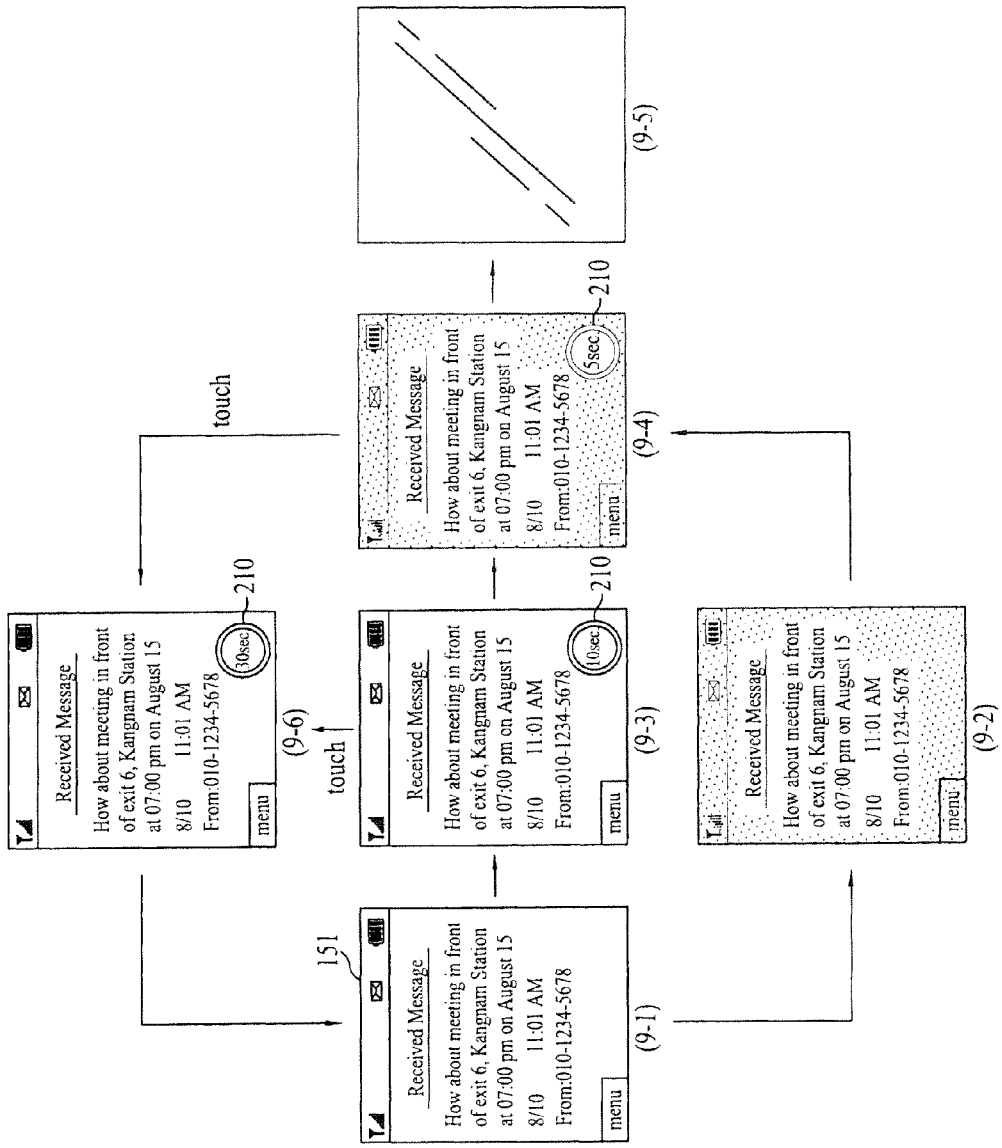
FIG. 9 is a diagram illustrating a method of controlling a display in a mobile terminal according to an embodiment of the present invention.

Referring to FIGS. 8 and 9, when a mobile terminal user checks a message received via the mobile terminal 100, the received message is displayed on a display screen 151 and the backlight is turned on with predetermined brightness (9-1) (S81 in FIG. 8). The brightness of the display screen 151 decreases (9-2) after a first preset period (S82 'Yes' in FIG. 8) which has begun since the last manipulation of the mobile terminal 100 in (9-1) (S83 in FIG. 8).

After the brightness of the display screen 151 decreases (9-2) (S83 in FIG. 8), the display control status information is displayed at a portion of the display screen, indicating the remaining time in the display control expiration period (S84 in FIG. 8). For example, an icon 210 indicates the remaining time, '5 sec.' in the display control expiration period, as shown in (9-4). The display control status information may be displayed subsequently or in a predetermined period of time after the brightness of the display screen 151 has decreased. Therefore, there may be a time gap between S83 and S84 in FIG. 8, depending on the preset configuration of the mobile terminal 100.

If no action is taken by the mobile terminal user or no input is received by the mobile terminal 100 during the display control expiration period (S85 'No' in FIG. 8), the display control expiration period expires (S86 in FIG. 8), and the backlight of the display screen 151 is eventually turned off (9-5) (S87 in FIG. 8). In other words, the display screen 151 is turned off at the end of the display control expiration period (9-5) (S87 in FIG. 8).

Alternatively, similar to the above described embodiment of the present invention exemplified by FIG. 6, the display control status information may be displayed while the backlight of the display screen 151 is still on and the brightness is not decreased, skipping S83 in FIG. 8, when the first preset period ends. For example, the display control status information is displayed as an icon 210, specifically '10 sec.' to indicate the remaining time in a display control expiration period, as shown in (9-3). As the remaining time in the display control expiration period decreases with the passage of time, when the remaining time reaches a preset time point, the display screen 151 is dimmed while the remaining time is still being displayed as the icon 210. For example, the preset time point for the display screen 151 to be dimmed is 5 seconds, as shown in (9-4). In both (9-3) and (9-4) when the control expiration period is displayed, the number in the icon 210 may actually decrease from 10 sec. and 5 sec, respectively, to show gradual decrease of the remaining time.

When the display control status information is displayed as the icon 210, as in FIG. 6, or the bar gauge 220, as in FIG. 7, the illumination period is extended or the display control expiration period is reset (S85 'Yes' in FIG. 8) by manipulating the icon or the bar gauge. For example, in (9-2) or (9-3) of FIG. 9, the terminal user touches the icon 210 on the display screen 151 to reset the display control expiration period to 30 seconds, as shown in (9-6). If no action is taken by the user in (9-4) or the display control expiration period expires, the display screen 151 is turned off (9-5).

In the above described embodiments of the present invention, the illumination or display control expiration period is temporarily increased for a predetermined duration of time. Alternatively, the illumination or display control expiration period may be increased indefinitely rather than temporarily extending the period such that the illumination stays on until a further instruction is input manually by the user.

Figure 10:
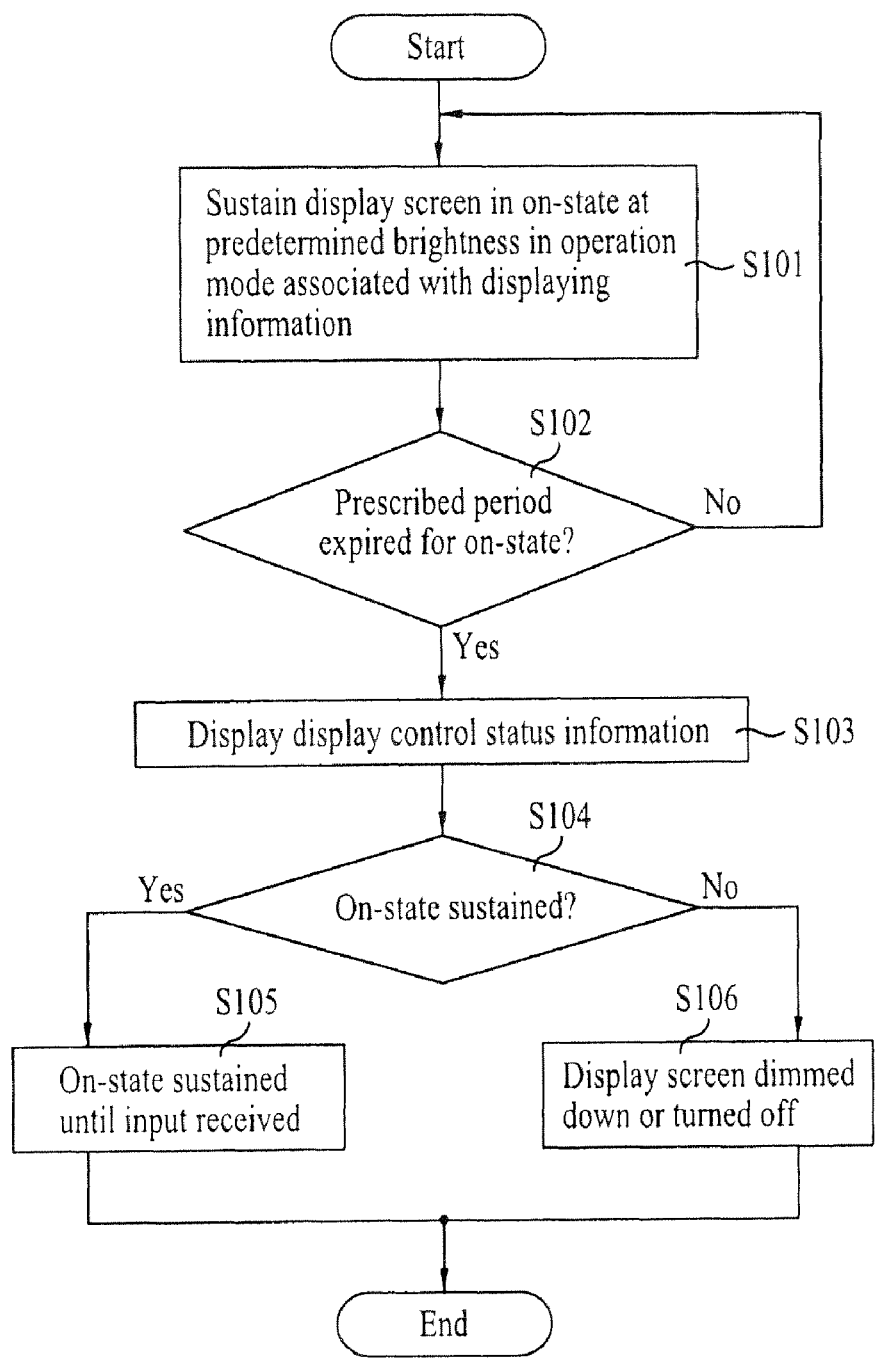
FIG. 10 is a flowchart illustrating a method of controlling a display in a mobile terminal according to an embodiment of the present invention.
Figure 11:
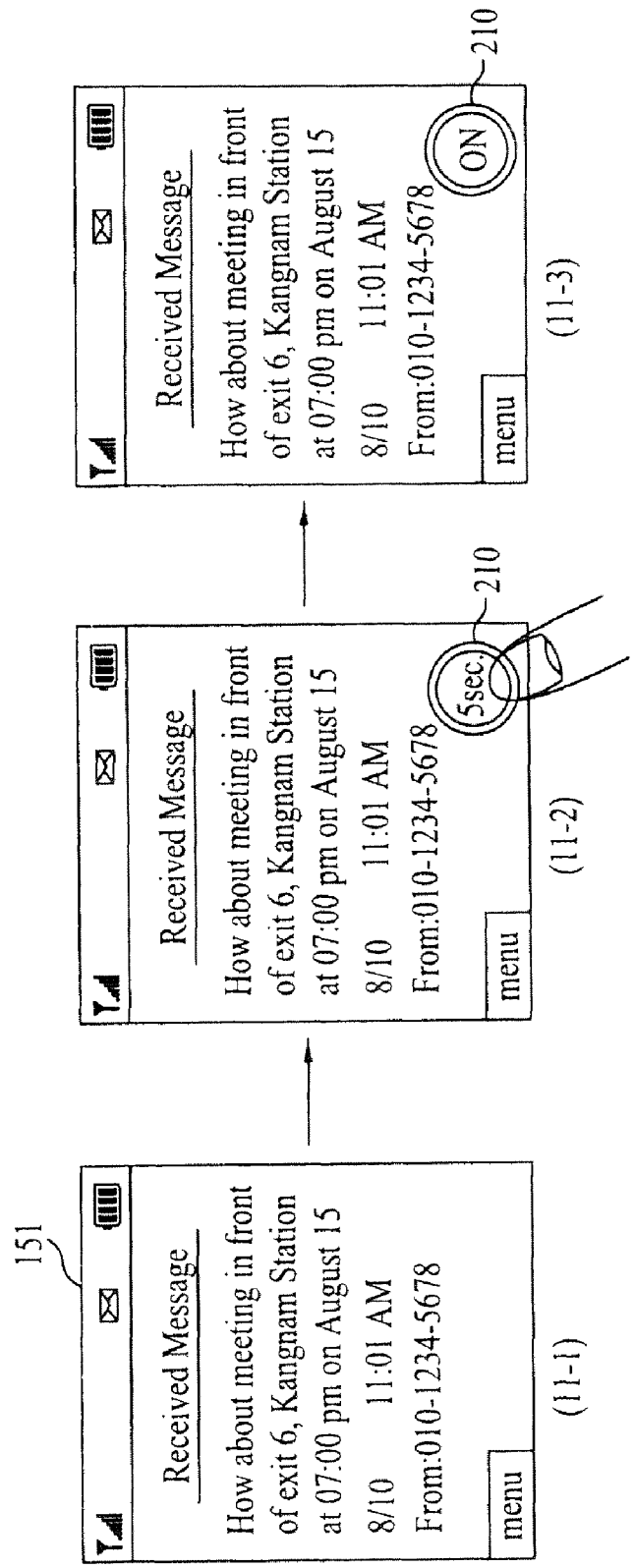
FIG. 11 is a diagram illustrating a method of controlling a display in a mobile terminal according to an embodiment of the present invention.

Referring to FIGS. 10 and 11, when a message is received via the mobile terminal 100, the display screen 151 is turned on in response to a user's input. The received message is displayed on the display screen 151 at predetermined brightness (S101 in FIG. 10) (11-1). When it reaches a preset period since the message has been displayed on the display screen 151 (S102 'Yes' in FIG. 10), the display control status information is displayed at a portion of the display screen to indicate the start of the display control expiration period (S103 in FIG. 10). For example, the display control status information is displayed as an icon 210 indicating the actual remaining time '5 sec' in the display control expiration period, as shown in (11-2).

In the above described embodiment of the present invention, touching the icon 210 extended the illumination period or reset the display control expiration period such that the backlight stays on for a predetermined time. In the presently described embodiment of the invention, if the icon 210 representing the display control status information is touched (S104 'Yes' in FIG. 10), an indicator 'ON' appears in the icon 210 (11-3). If the icon 210 '5 sec.' is not touched or no input is received by the mobile terminal 100 before the display control expiration period expires in (11-2) (S104 'No' in FIG. 10), the display screen 151 is configured to be dimmed or turned off (S106).

Once the 'ON' icon is on as in (11-3), the backlight stays on until the display screen 151 is manually turned off by the user (S105). Therefore, the mobile terminal user can see the display screen 151 without worrying about the display screen being turned off abruptly. The display screen 151 may be turned off by touching a separate turn-off icon on the touch screen or by manipulating a designated input key elsewhere.

Figure 12:
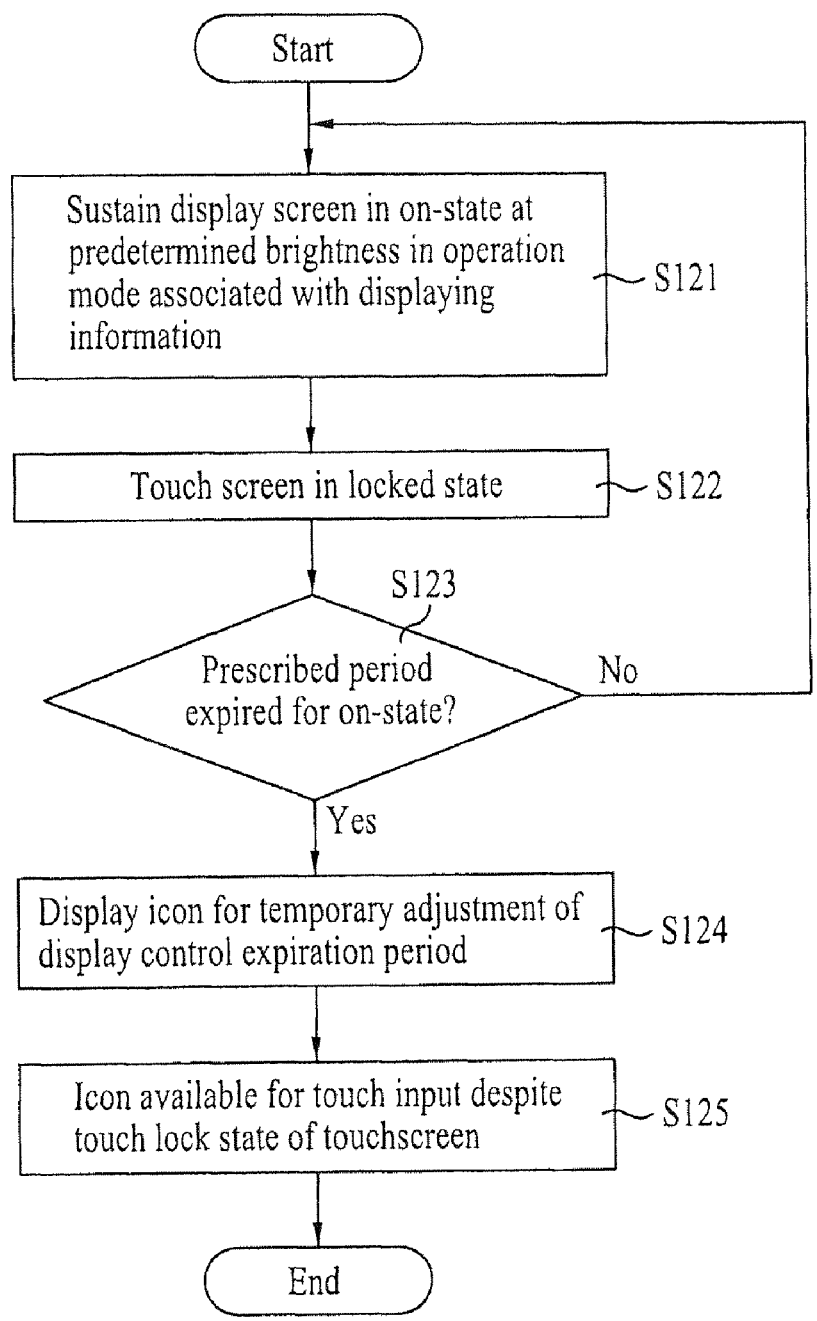
FIG. 12 is a flowchart illustrating a method of controlling a display in a mobile terminal according to an embodiment of the present invention.
Figure 13:
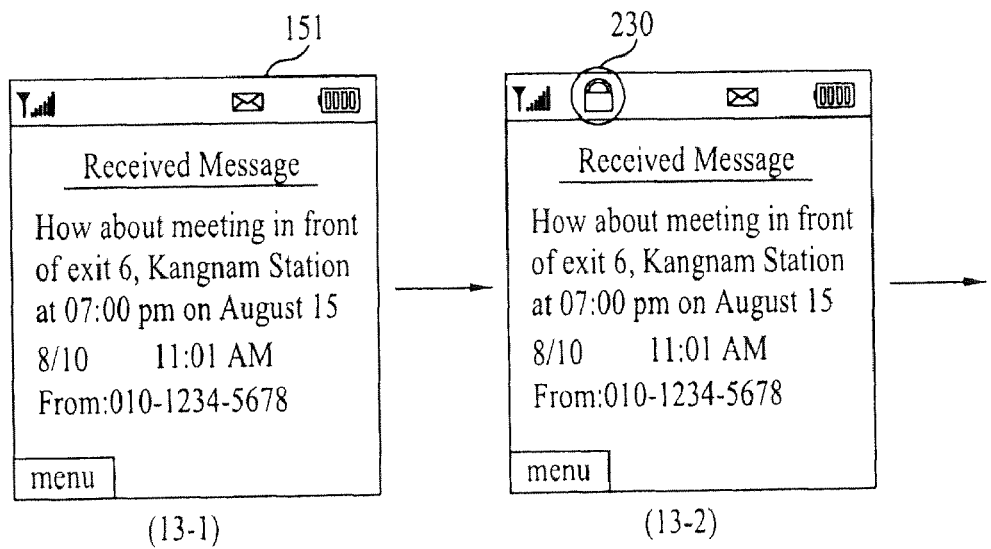
FIG. 13 is a diagram illustrating a method of controlling a display in a mobile terminal according to an embodiment of the present invention.
Figure 13:
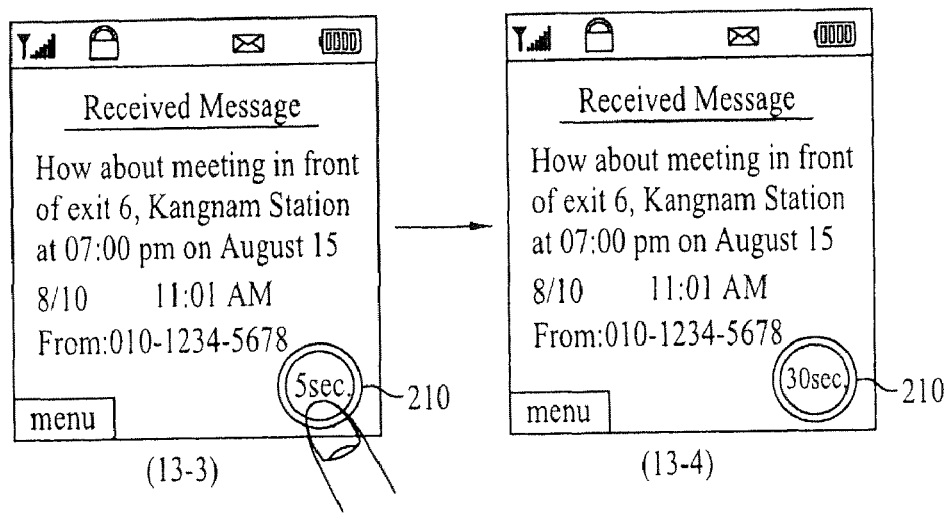

Referring to FIGS. 12 and 13, while a terminal user is checking a message received via the mobile terminal 100, the received message is displayed on the display screen 151 at predetermined brightness (S121 in FIG. 121) (13-1). In an embodiment of the present invention, a touch lock function is provided to the mobile terminal 100 to prevent recognition of touch on the display screen 151. For example, a touch lock indicator 230 displayed at a portion of the display screen 151 is activated (S122 in FIG. 12) such that the mobile terminal 100 does not respond to any touch on the touch screen, as shown in (13-2).

While the touch lock function is on as shown in (13-2), if it reaches a preset period (S123 'Yes' in FIG. 12) since the received message has been displayed as in (13-1), the display control status information is displayed as an icon 210 '5 sec.', as shown in (13-3) (S124 in FIG. 12). In the presently described embodiment of the invention, even if the touch lock function is activated, the icon 210 is configured to recognize a touch by the terminal user (S125 in FIG. 12). Therefore, when the touch lock function is activated as in (13-2), if the terminal user touches the icon 210 displayed on the display screen 151 (13-3), the display control expiration period will be reset and increased to '30 sec.' as shown in (13-4).

The touch lock function remains active even if the display control status information is displayed on the display screen 151. Accordingly, while the touch lock indicator 230 appears as active in (13-3) and the touch screen is still locked, only the icon 210 portion is unlocked such that the user can increase the illumination period or display control expiration period by touching the icon 210.

As described above, the present invention provides several features. First, the present invention facilitates a terminal user to recognize a remaining time period before the state of the display screen is changed, for example, reduced brightness or being turned off to reduce power consumption of the mobile terminal after a preset period if no operation is detected by the mobile terminal. Second, the display control expiration period can be easily adjusted temporarily or indefinitely to extend the illumination period. Third, even if the touch screen of the mobile terminal is set in a touch lock state, the display control expiration period can be easily adjusted to extend the backlight illumination on the display screen.

The above-described methods can be implemented in a program recorded medium as computer-readable codes. The computer-readable media include all kinds of recording devices in which data readable by a computer system are stored. For example, the computer-readable media include ROM, RAM, CD-ROM, magnetic tapes, floppy discs, optical data storage devices, and the like and also include carrier-wave type implementations (e.g., transmission via Internet). And, the computer can include the control unit 180 of the mobile terminal.

The foregoing embodiments and advantages are merely exemplary and are not to be construed as limiting the present invention. The present teaching can be readily applied to other types of apparatuses and processes. The description of the present invention is intended to be illustrative, and not to limit the scope of the claims. Many alternatives, modifications, and variations will be apparent to those skilled in the art.

What is claimed is:

1. A method of controlling a display screen in a wireless mobile terminal, the method comprising:
displaying information on a display at a first display state with a display control expiration period;
transitioning from the first display state to a second display state upon expiration of the display control expiration period, the second display state being a state that is less illuminated than the first display state or a turned-off state;
displaying display control status information on a portion of the display prior to expiration of the display control expiration period, the display control status information including time remaining until the expiration of the display control expiration period; and
adjusting the display control expiration period in response to recognizing an external user input,
wherein the time remaining is displayed in a countdown manner such that a value of the time remaining repeatedly decreases during the display control expiration period until the expiration of the display control expiration period.

2. The method of claim 1, wherein the value of the time remaining comprises a numerical value, the method further comprising restarting countdown of the time remaining for the display control expiration period in response to the external user input.

3. The method of claim 1, wherein the value of the time remaining is displayed in seconds.

4. The method of claim 1, wherein the external user input is received via a touch screen or a predetermined switch.

5. The method of claim 4, wherein the display control status information comprises a time line bar representing the remaining time.

6. The method of claim 5, wherein the display control expiration period is adjusted in response to the external user input that comprises a touch and drag motion received on the time line bar displayed on the display comprising the touch screen.

7. The method of claim 1, wherein the display control expiration period is adjusted in response to multiple external user inputs.

8. The method of claim 1, wherein the display remains at the first display state upon recognizing the external user input and until a further external user input is recognized.

9. A method of controlling a display screen in a wireless mobile terminal, the method comprising:
displaying information on a display at a first display state such that the information is visible;
starting a first preset period while the information is displayed on the display at the first display state;
timing the first preset period; and
displaying display control status information on a portion of the display after the first preset period ends, the display control status information including time remaining until the first display state is transitioned to a second display state,
wherein the display is less illuminated compared to the first display state or turned off at the second display state, and the time remaining is displayed in a countdown manner such that a value of the time remaining repeatedly decreases until transitioned to the second display state.

10. The method of claim 9, wherein the time remaining is displayed in seconds.

11. The method of claim 9, wherein brightness of the display decreases stepwise as the time remaining decreases gradually until transitioned to the second display state.

12. The method of claim 9, further comprising:
transitioning from the first display state to the second display state after a display control expiration period ends, wherein the display control expiration period starts when the first preset period ends, and wherein the display control status information is displayed during the display control expiration period.

13. The method of claim 12, further comprising:
increasing the display control expiration period in response to an external input received before the display control expiration period ends, wherein the first display state is maintained during the display control expiration period.

14. The method of claim 12, wherein the display is in a less illuminated display state compared to the first display state during the display control expiration period.

15. The method of claim 9, further comprising:
starting a display control expiration period, in which the display control status information is displayed, when the first preset period ends, wherein the display control expiration period is associated with controlling a display state.

16. The method of claim 9, further comprising:
turning off the display after a display control expiration period and when the display is transitioned to the second display state if no input is received by the wireless mobile terminal during the display control expiration period, wherein the display control expiration period, which starts after the preset period ends, is associated with controlling a display state.

17. The method of claim 9, further comprising:
decreasing illumination on the display after a display control expiration period ends and when the display is transitioned to the second display state if no input is received by the wireless mobile terminal during the display control expiration period, wherein the display control expiration period, in which the display control status information is displayed, starts after the first preset period ends.

18. The method of claim 9, further comprising:
turning off the display in response to an external user input, wherein the external user input is received via a touch screen or a predetermined switch.

19. The method of claim 9, further comprising:
displaying the information continuously at the first display state in response to an external user input, wherein the external user input is received via a touch screen or a predetermined switch.

20. A wireless mobile terminal, comprising:
a display;
a user input unit configured to receive an external user input; and
a control unit configured to:
  display information on the display unit at a first display state with a display control expiration period;
  transition the display from the first display state to a second display state, the second display state being a state that is less illuminated than the first display state or a turned-off state;
  display display control status information on a portion of the display prior to expiration of the display control expiration period, the display control status information including time remaining until the expiration of the display control expiration period; and
  adjust the display control expiration period in response to the external user input,
wherein the time remaining is displayed in a countdown manner such that a value of the time remaining repeatedly decreases during the display control expiration period until the expiration of the display control expiration period.

21. The wireless mobile terminal of claim 20, wherein the value of the time remaining comprises a numerical value, and wherein the control unit is further configured to restart countdown of the time remaining for the display control expiration period in response to the external user input.

22. The wireless mobile terminal of claim 20, wherein the value of the remaining time is displayed in seconds.

23. The wireless mobile terminal of claim 20, wherein the user input unit comprises a touch screen or a predetermined switch.

24. The wireless mobile terminal of claim 23, wherein the display control status information comprises a time line bar representing the time remaining.

25. The wireless mobile terminal of claim 24, wherein the user input unit comprises the touch screen and the display control expiration period is adjusted in response to the external user input that comprises a touch and drag motion received on the time line bar displayed on the touch screen of the display unit.

26. The wireless mobile terminal of claim 20, wherein the display control expiration period is adjusted in response to multiple external user inputs.

27. The wireless mobile terminal of claim 20, wherein the display remains at the first display state upon recognizing the external user input and until a further external user input is recognized.

28. The method of claim 17, further comprising:
turning off the display if no input is received by the wireless mobile terminal during a predetermined time period after the display is transitioned to the second display state.

29. The method of claim 2, wherein the last numerical value is "0" for the countdown of the time remaining and the display screen is transitioned from the first display state to the second display state after "0" is displayed.

30. The method of claim 2, wherein the external user input is received via a touch screen coupled with the display and comprises touching at least a portion the value displayed on the touch screen.

* * * * *